United States Patent
Machida et al.

(10) Patent No.: US 7,531,043 B2
(45) Date of Patent: May 12, 2009

(54) MAGNETIC DISK SUBSTRATE AND PRODUCTION METHOD OF MAGNETIC DISK

(76) Inventors: Hiroyuki Machida, c/o Showa Denko HD K.K., 5-1, Yawata Kaigan dori, Ichihara, Chiba (JP) 290-0067; Katsuaki Aida, c/o Showa Denko HD K.K., 5-1, Yawata Kaigan dori, Ichihara, Chiba (JP) 290-0067

(*) Notice: Subject to any disclaimer, the term of this patent is extended or adjusted under 35 U.S.C. 154(b) by 0 days.

(21) Appl. No.: 11/660,741

(22) PCT Filed: Aug. 26, 2005

(86) PCT No.: PCT/JP2005/016051
§ 371 (c)(1),
(2), (4) Date: Feb. 22, 2007

(87) PCT Pub. No.: WO2006/022444
PCT Pub. Date: Mar. 2, 2006

(65) Prior Publication Data
US 2007/0264531 A1 Nov. 15, 2007

Related U.S. Application Data

(60) Provisional application No. 60/606,887, filed on Sep. 3, 2004.

(30) Foreign Application Priority Data
Aug. 27, 2004 (JP) ............ 2004-248610

(51) Int. Cl.
*B08B 7/04* (2006.01)
*B24B 7/30* (2006.01)
*G11B 5/71* (2006.01)
*C03C 15/00* (2006.01)

(52) U.S. Cl. ............ 134/3; 134/28; 65/30.12; 428/846.9

(58) Field of Classification Search ............ 451/41, 451/42, 36, 28; 65/30.1, 54; 510/452, 454, 510/483; 252/175, 179; 428/846.9; 156/99; 134/3, 26, 28
See application file for complete search history.

(56) References Cited

U.S. PATENT DOCUMENTS

| 4,072,622 | A | * | 2/1978 | Kuhling et al. ............ 252/179 |
| 4,169,075 | A | * | 9/1979 | Kuhling et al. ............ 510/452 |
| 6,568,995 | B1 | * | 5/2003 | Mitani et al. ............ 451/36 |
| 6,719,615 | B1 | * | 4/2004 | Molnar ............ 451/41 |
| 2002/0015863 | A1 | | 2/2002 | Nakajima et al. |
| 2003/0079500 | A1 | * | 5/2003 | Umeyama ............ 65/30.1 |

FOREIGN PATENT DOCUMENTS

| JP | 2000-262991 A | | 9/2000 |
| JP | 2001-312817 A | | 11/2001 |
| JP | 2003-141717 A | * | 5/2003 |
| JP | 2003-141718 A | | 5/2003 |

OTHER PUBLICATIONS

Translation JA 2003141717 A.*

* cited by examiner

Primary Examiner—Kevin M Bernatz
Assistant Examiner—Louis Falasco
(74) Attorney, Agent, or Firm—Sughrue Mion, PLLC

(57) ABSTRACT

The invention can provide a production method for a magnetic disk substrate capable of reducing the number of surface defects of a glass substrate. When a magnetic disk is produced by using the resulting magnetic disk substrate, the yield and, furthermore, the reliability can be improved.

When a surface of a magnetic disk substrate is washed after it is polished, the glass substrate is dipped into a washing solution while the surface of the glass substrate polished is held under a wet condition. The wet condition of the surface of the glass substrate includes a condition in which the glass substrate is dipped into water that may contain a surfactant, and a condition in which a liquid film is formed substantially on the entire surface.

8 Claims, No Drawings

MAGNETIC DISK SUBSTRATE AND PRODUCTION METHOD OF MAGNETIC DISK

CROSS-REFERENCES TO RELATED APPLICATIONS

This application is an application filed under 35 U.S.C. §111(a) claiming benefit pursuant to 35 U.S.C. §119(e) of the filing date of Provisional Application No. 60/606,887, filed Sep. 3, 2004, pursuant to 35 U.S.C. §111(b).

TECHNICAL FIELD

This invention relates to a magnetic disk substrate and a production method for a magnetic disk.

BACKGROUND ART

Magnetic disk devices have made remarkable progress, as external storage devices of computers, owing to their superior of cost/performance ratio and further growth is expected. An aluminum type substrate has been used in the past as a substrate of a magnetic disk which is mounted to the magnetic disk device, but glass substrates, such as chemically tempered glass and crystallized glass, have gradually gained wider application because they have high impact resistance and can be more easily made flat. In other words, the aluminum type substrate can easily provide a magnetic disk having excellent magnetic characteristics but involves the problem of lack of flatness because it can suffer plastic deformation during a mechanical process such as polishing. In contrast, the glass substrate can be easily made flat because it has high surface hardness and does not involve the plastic deformation described above.

Various washing methods have been proposed in the past to sufficiently remove adhering surface matter in a glass substrate production process that laps, polishes and washes the surface of these glass substrates. For example, these methods include a method that processes the glass substrate by a fluorine type solution having pH of 3 to 7 (Japanese Unexamined Patent Publication (Kokai) No. 2000-262991), a method that washes the glass substrate with anodic water obtained by electrolyzing pure water (Japanese Unexamined Patent Publication (Kokai) No. 2001-312817) and a method that washes the glass substrate with a washing solution containing an acid and a reducing agent (Japanese Unexamined Patent Publication (Kokai) No. 2001-206737).

DISCLOSURE OF THE INVENTION

The inventor of this invention has conducted various studies regarding a processing method of a glass substrate after its surface is polished, and has made the present invention. In other words, the invention provides a production method for a magnetic disk substrate and a production method for a magnetic disk that can further reduce the number of defects on a glass substrate surface.

The present invention provides the following inventions to solve the problems described above.

(1) A production method of a magnetic disk substrate using washing a surface of a glass substrate after it is polished, characterized in that the glass substrate is dipped into a washing solution while the surface of the polished glass substrate is held in a wet condition.
(2) The production method of a magnetic disk substrate as described in (1), wherein the wet condition of the surface of the glass substrate is a dip condition into water that may contain a surfactant or carboxylic acids.
(3) The production method of a magnetic disk substrate as described in (1), wherein the wet condition of the surface of the glass substrate is a condition where a liquid film of water, that may contain a surfactant or carboxylic acids, is formed substantially on the entire surface.
(4) The production method of a magnetic disk substrate as described in (2), wherein, immediately after polishing, the glass substrate is dipped into water that may contain a surfactant or carboxylic acids.
(5) The production method of a magnetic disk substrate as described in any of (2) through (4), wherein the carboxylic acids are mono- or poly-chain carboxylic acids.
(6) The production method of a magnetic disk substrate as described in (5), wherein the poly-chain carboxylic acids are oxalic acid, citric acid, tartaric acid, malic acid or malonic acid.
(7) The production method of a magnetic disk substrate as described in (6), wherein the poly-chain carboxylic acids are oxalic acid.
(8) The production method of a magnetic disk substrate characterized in that a magnetic recording layer is formed on the magnetic disk substrate as described in any of (1) through (6).
(9) The magnetic disk substrate for a magnetic recording medium, produced by a production method as described in any of (1) through (8).
(10) The magnetic recording medium produced using a magnetic disk substrate as described in (9).

The invention can provide a production method of a magnetic disk substrate and a production method of a magnetic disk that can further reduce the number of surface defects on a glass substrate.

BEST MODE FOR CARRYING OUT THE INVENTION

When a surface of a glass substrate is washed after it is polished, the production method of the magnetic disk substrate according to the invention dips the glass substrate in a washing solution while the surface of the glass substrate polished is held in a wet condition.

Amorphous, chemically tempered or crystallized glass that has generally been used for the magnetic disk substrate can be used as the glass substrate in the invention. Examples are glasses such as soda lime, aluminosilicate, lithium silicate, lithium aluminosilicate, aluminoborosilicate, and so forth. As the chemically tempered glass, glass that is brought into contact with a molten salt at a high temperature to cause ion exchange of alkali ions in the glass with different kinds of alkali ions in the molten salt, and is reinforced by the compressive stress, is suitable. Examples of the crystallized glass are those which are obtained by re-heating glass under a controlled condition and precipitating and growing a large number of fine crystals. Concrete examples are an $Al_2O_3$—$SiO_2$—$Li_2O$ type, a $B_2O_3$—$Al_2O_3$—$SiO_2$—$Li_2O$ type, and so forth. The thickness of such glass substrates is generally selected from the range of about 0.1 to about 2 mm.

Polishing of the surface of the glass substrate in the invention can be carried out in a customary manner. An example of polishing is the one that abrades the surface of the glass substrate and a lap plate with each other in succession to lapping, by using a polishing carrier, through an abrasive slurry prepared by dispersing free abrasives into water, or the like. Examples of the abrasives are cerium oxide, zirconium oxide, silicon dioxide, etc, but cerium oxide is suitable from the aspect of the polishing speed.

In the invention, polishing is suitably carried out by using the polishing carrier having an inner surface that can come into contact with the outer end face of the glass substrate and is coated with a resin. The resin used for resin coating is a thermoplastic resin such as polyester, polyamide, polyolefin, ABS or polystyrene resin or a thermosetting resin such as epoxy, phenol, unsaturated polyester or polyimide resin, but an epoxy resin is most suitable. Preferably, these resins are not fiber reinforced. The thickness of the resin coating is selected from the range of about 10 μm to about 1 mm.

An example of the condition in which the surface of the glass substrate is wet in the invention is a condition in which the glass substrate is dipped into water that may contain a surfactant or carboxylic acids. For this purpose, the glass substrate is appropriately dipped immediately after polishing into water that may contain the surfactant or the carboxylic acids. The wet condition may further be a condition in which a liquid film is formed substantially on the entire surface though the glass substrate is not dipped into water that may contain the surfactant or the carboxylic acids. In the invention, the glass substrate is thus delivered to the next washing step while the surface of the glass substrate remains wet.

The surfactant may be any of a cationic type such as an alkyl pyridinium salt, alkyltrimethylammonium salt, etc, an anionic type such as an alkylbenzenesulfonate, soap, etc, and a nonionic type such as an alkyl polyoxyethylene ether aliphatic acid polyhydric alcohol ester.

On the other hand, the carboxylic acids are mono-chain carboxylic acids such as acetic acid or poly-chain carboxylic acids such as oxalic acid, citric acid, tartaric acid, malic acid and malonic acid, but oxalic acid is preferred.

Examples of water that may contain the surfactant or carboxylic acids described above include water and water containing the surfactant and/or carboxylic acids. However, this water may contain other components for various purposes.

In the invention, the glass substrate under the state where the surface of the glass substrate polished as described above is kept wet is dipped into the washing solution. The washing solution is not limited, in particular, and may be water that may contain the surfactant or carboxylic acids described above, for example.

According to the method of the invention, the glass substrate the surface defects of which are reduced can be required. It is assumed that according to the method of the invention, fixation of adhering particles to the surface of the glass substrate occurs difficultly.

The resulting magnetic disk substrate is used for the production of a magnetic disk. For example, texturing for forming texture grooves in a head traveling direction is first applied to the substrate, whenever necessary. Next, a base film made of a Cr alloy is formed by sputtering on this substrate. A magnetic recording layer made of a Co base alloy is formed to a thickness of about 10 to 100 nm on this base film. A protective film of carbon, or the like, is preferably formed further on this magnetic recording layer to improve corrosion resistance, sliding resistance, etc. Hydrogenated carbon by sputtering or diamond-like carbon by CVD, for example, is formed to a film thickness of about 1 to about 50 nm as this carbon.

Perfluoropolyether or a product obtained by esterifying or amidating the terminals of the former is diluted with a solvent and is applied by spraying, dipping, spin coating, etc to a film thickness of about 0.5 to 5 nm as a lubrication layer to the surface of this carbon protective film, and durability, reliability, etc can be further improved.

Production yield and furthermore, reliability, can be improved when the magnetic disk is produced by using the magnetic disk glass substrate acquired by the method of the invention.

Though the invention will be explained in further detail with reference to Examples thereof, the invention is not limited to these Examples unless the invention exceeds the gist thereof.

Measurement of the number of surface defects of glass substrates were carried out by using an optical surface inspection apparatus (produced by Hitachi High Technologies, Co.).

Positive defects, one of surface defects, detected by such apparatus represents the counted raised defects on the surface. Further, negative defects, one of the surface defects, detected by such apparatus represents the pits defects in the surface.

The number of surface defects was defined as the quotient obtained by dividing the total number of defects on both surfaces by the number of measurement surfaces (120 surfaces) for sixty glass substrates.

EXAMPLE 1

A 2.5-in. lithium silicate type crystallized glass substrate was lapped and polished. Cerium oxide abrasive slurry (cerium oxide concentration 10 mass %) was supplied and the glass substrate was processed at a number of revolutions of stool of 15 rpm and a processing pressure of 100 g/cm$^2$ (about 9,806 Pa) to a predetermined thickness (lapping) and at a number of revolutions of stool of 30 rpm and a processing pressure of 65 g/cm$^2$ (about 6,374 Pa) for 35 minutes (polishing). The resulting glass substrate was immediately dipped into a solution containing oxalic acid (prepared by diluting "MO2" of Kanto Kagaku K. K. to 1% by water), was sent to a next washing step, while the substrate surface was kept in the wet condition, was dipped into a washing solution, was replaced by isopropyl alcohol and was dried. When the number of surface defects of the resulting glass substrate were measured, positive defects was 2.8 and negative defects were 2.9.

On the resulting glass substrate were formed serially by sputtering at a substrate temperature of 200° C. a Cr film as a base layer to 60 nm, a $CO_{13}Cr_6Pt_3Ta$ alloy film as a magnetic recording layer to 20 nm and a diamond-like carbon film as a protective layer to 10 nm. Furthermore, a perfluoropolyether lubrication layer was applied by dipping to a thickness of 3 nm, giving a magnetic disk. This magnetic disk had excellent characteristics.

EXAMPLE 2

A glass substrate was obtained in the same way as in Example 1 with the exception that water was used in place of the solution containing oxalic acid. When the surface defects were measured, positive defects were 7.2 and negative defects were 7.0.

COMPARATIVE EXAMPLE 1

A glass substrate was obtained in the same way as in Example 1 with the exception that the glass substrate obtained by polishing was not dipped into oxalic acid and a part of its surface was not under the wet condition. When the surface defects were measured, positive defects and negative defects were 20 to 30.

INDUSTRIAL APPLICABILITY

The invention can provide a production method of a magnetic disk substrate capable of reducing the number of surface defects of a glass substrate and a production method of a magnetic disk.

The invention claimed is:

1. A production method for a magnetic disk substrate wherein a surface of a glass substrate is washed after it is polished, comprising wetting said glass substrate between polishing and washing, with a wetting solution comprised of water and a carboxylic acid, and dipping the wetted glass substrate into a washing solution while the surface of said polished glass substrate is kept in a wet condition by the wetting solution.

2. The production method of a magnetic disk substrate according to claim 1, wherein the wet condition of the surface of said polished glass substrate is a dip condition into water containing the carboxylic acid or containing the carboxylic acid and a surfactant.

3. The production method of a magnetic disk substrate according to claim 1, wherein the wet condition of the surface of said polished glass substrate is a condition where a liquid film of water containing the carboxylic acid or containing the carboxylic acid and a surfactant, is formed substantially on the entire surface.

4. The production method of a magnetic disk substrate according to claim 2, wherein, immediately after polishing, said glass substrate is dipped into water, containing the carboxylic acid or containing the carboxylic acid and a surfactant.

5. The production method of a magnetic disk substrate according to claim 2, wherein said carboxylic acid is a mono- or poly-chain carboxylic acid.

6. The production method of a magnetic disk substrate according to claim 5, wherein said poly-chain carboxylic acid is oxalic acid, citric acid, tartaric acid, malic acid or malonic acid.

7. The production method of a magnetic disk substrate according to claim 6, wherein said poly-chain carboxylic acid is oxalic acid.

8. The production method of a magnetic disk characterized in that a magnetic recording layer is formed on said magnetic disk substrate according to claim 1.

* * * * *

UNITED STATES PATENT AND TRADEMARK OFFICE
CERTIFICATE OF CORRECTION

PATENT NO. : 7,531,043 B2
APPLICATION NO. : 11/660741
DATED : May 12, 2009
INVENTOR(S) : Hiroyuki Machida and Katsuaki Aida It is certified that error appears in the above-identified patent and that said Letters Patent is hereby corrected as shown below:

Title Page: Item (76) should be changed to Item (75)

Title Page: please insert the following entry between items (76) and (*)

-- (73)   Assignee: Showa Denko K.K., Tokyo (JP) --

Signed and Sealed this
Twenty-third Day of July, 2013

Teresa Stanek Rea
*Acting Director of the United States Patent and Trademark Office*